(12) United States Patent
Huang-Fu et al.

(10) Patent No.: US 10,764,952 B2
(45) Date of Patent: Sep. 1, 2020

(54) MAINTENANCE OF FORBIDDEN TACKING AREA LIST IN NR SYSTEMS

(71) Applicant: MEDIATEK INC., Hsinchu (TW)

(72) Inventors: Chien-Chun Huang-Fu, Hsinchu (TW); Pan-Yen Chiang, Hsinchu (TW); Marko Niemi, Oulu (FI); Yuan-Chieh Lin, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/244,259

(22) Filed: Jan. 10, 2019

(65) Prior Publication Data

US 2019/0223246 A1 Jul. 18, 2019

Related U.S. Application Data

(60) Provisional application No. 62/617,151, filed on Jan. 12, 2018, provisional application No. 62/633,684, filed on Feb. 22, 2018.

(51) Int. Cl.
*H04W 4/00* (2018.01)
*H04W 76/18* (2018.01)
(Continued)

(52) U.S. Cl.
CPC ....... *H04W 76/18* (2018.02); *H04M 1/72577* (2013.01); *H04W 4/90* (2018.02); *H04W 48/04* (2013.01)

(58) Field of Classification Search
CPC ....... H04W 76/18; H04W 48/04; H04W 4/90; H04W 76/50; H04M 1/72577
(Continued)

(56) References Cited

U.S. PATENT DOCUMENTS

2012/0057568 A1* 3/2012 Lim .............. H04W 76/50
370/331
2012/0252397 A1* 10/2012 Kumar .............. H04W 48/16
455/404.1
(Continued)

FOREIGN PATENT DOCUMENTS

| CN | 102687553 A | 1/2010 |
| CN | 104080074 A | 3/2013 |
| CN | 105230083 A | 5/2013 |

OTHER PUBLICATIONS

International Search Report and Written Opinion of International Search Authority for PCT/CN2019/071354 dated Mar. 22, 2019 (10 pages).

*Primary Examiner* — Chuong T Ho
(74) *Attorney, Agent, or Firm* — Imperium Patent Works; Zheng Jin

(57) ABSTRACT

A method of maintaining a proper forbidden tracking area identifier (TAI) list is proposed. A UE receives a service area list comprising one or more allowed tracking areas. The service area list may be carried by a configuration update command. UE compares if any of the allowed tracking area having a matching TAI in the forbidden TAI list. Accordingly, UE removes any allowed tracking areas having a matching TAI from the forbidden TAI list. In one embodiment, UE sends a REGISTRATION REQUEST message to initiate a registration procedure. In response, UE receives a REGISTRATION ACCEPT message, which may also carry a service area list. UE may remove the allowed tracking area having a matching TAI from the forbidden TAI list. However, if UE is registered for emergency services, then UE shall not remove the allowed tracking area from the forbidden TAI list.

18 Claims, 4 Drawing Sheets

(51) Int. Cl.
*H04W 4/90* (2018.01)
*H04M 1/725* (2006.01)
*H04W 48/04* (2009.01)

(58) Field of Classification Search
USPC .................................................. 370/329, 330
See application file for complete search history.

(56) References Cited

U.S. PATENT DOCUMENTS

| | | | |
|---|---|---|---|
| 2014/0092871 A1* | 4/2014 | Wang | H04W 36/34 370/331 |
| 2014/0295837 A1* | 10/2014 | Madasamy | H04W 48/04 455/435.1 |
| 2015/0245256 A1 | 8/2015 | Kiss | 455/436 |
| 2016/0007242 A1 | 1/2016 | Jeong et al. | 370/331 |
| 2016/0373974 A1 | 12/2016 | Gomes et al. | 370/331 |
| 2019/0246342 A1* | 8/2019 | Wang | H04W 8/00 |
| 2019/0280926 A1* | 9/2019 | Miklos | H04L 41/0806 |

* cited by examiner

MAINTENANCE OF FORBIDDEN TACKING AREA LIST IN NR SYSTEMS

CROSS REFERENCE TO RELATED APPLICATIONS

This application claims priority under 35 U.S.C. § 119 from U.S. Provisional Application No. 62/617,151, entitled "Performance Enhancement for 5G Device", filed on Jan. 12, 2018; U.S. Provisional Application No. 62/633,684, entitled "Removal of allowed TAIs from forbidden TAI lists", filed on Feb. 22, 2018, the subject matter of which is incorporated herein by reference.

TECHNICAL FIELD

The disclosed embodiments relate generally to wireless communication, and, more particularly, to method of maintaining forbidden tracking area (TA) list in new radio (NR) systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board, has decided to focus the future NGMN activities on defining the end-to-end requirements for 5G new radio (NR) systems.

When a UE is in connected state, UE location is known by the network at cell level. When a UE is in idle state, UE location is known by the network at track area (TA) level. A tracking area code (TAC) is a unique code that each operator assigns to the TA. A tracking area identifier (TAI) consists of a PLMN ID and a TAC. A UE obtains a TAI list when it attaches to an LTE/NR network. This list shows the tracking areas where the UE is located and within which the UE can travel. The LTE/NR network has to have updated location information about UEs in idle state to find out in which TA a particular UE is located. The UE notifies the LTE/NR network of its current location by sending a tracking area update (TAU) request message in EPS or a registration request message in 5GS every time UE moves between TAs.

The mobility management in 5G NR systems has two types of TAI list—a list of allowed or non-allowed TAI and a list of forbidden TAI. When a UE attaches to a network and receives an error in a registration procedure, a TAI is added into the forbidden TAI list. The forbidden TAI list is maintained in the UE, and is reset by the UE when the UE is switched off, or when a universal integrated circuit card (UICC) containing the SIM/USIM is removed, or is periodically reset. In a subsequent registration procedure, the network may provide the UE with allowed tracking areas. The allowed tracking area(s) can be removed from the forbidden TAI list if one or more tracking areas in the forbidden TAI list are received from the network. However, if the UE is registered for emergency services, then the tracking area(s) may not be removed. Furthermore, the network may provide the UE with the allowed tracking areas via a configuration update command. A proper procedure of maintaining and updating the forbidden TAI list is desired.

SUMMARY

A method of maintaining a proper forbidden tracking area identifier (TAI) list is proposed. A UE receives a service area list comprising one or more allowed tracking areas. The service area list may be carried by a configuration update command or by a registration accept message in response to a registration request. UE compares if any of the allowed tracking area having a matching TAI in the forbidden TAI list. Accordingly, UE removes any allowed tracking areas having a matching TAI from the forbidden TAI list. In one embodiment, UE sends a REGISTRATION REQUEST message to initiate a registration procedure. If the registration procedure is successful, UE receives a REGISTRATION ACCEPT message, which may also carry a service area list. UE may remove the allowed tracking area having a matching TAI from the forbidden TAI list. However, if UE is registered for emergency services, then UE shall not remove the allowed tracking area from the forbidden TAI list.

In one embodiment, a UE maintains a forbidden tracking area identifier (TAI) list in a mobile communication network. The forbidden TAI list comprises a list of TAs where the UE is forbidden to receive services from the network. The UE receives a service area list from the network. The service area list comprises at least one allowed TAI. The UE removes the allowed TAI from the forbidden TAI list when a removing condition is satisfied. The removing condition comprises the UE finds a matching of the allowed TAI in the forbidden TAI list. In one embodiment, the service area list is carried by a configuration update command message transmitted from the network. In another embodiment, the service area list is carried by a registration accept message from the network in response to a registration request message. If the UE is registered for emergency services with or without PDU session, then the UE does not remove the allowed TAI from the forbidden TAI list.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
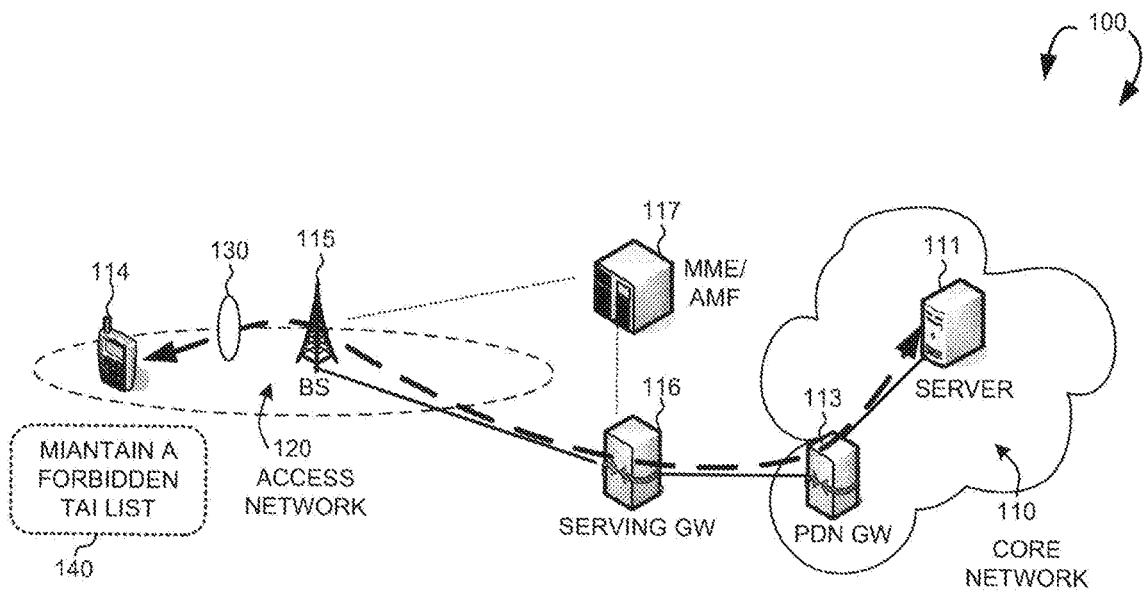
FIG. 1 illustrates an exemplary EPS/5GS network supporting UE registration and maintenance of forbidden tracking area identifier (TAI) list in accordance with one novel aspect.

FIG. 1 illustrates an exemplary 4G LTE or 5G new radio (NR) 100 network supporting UE registration and maintenance of forbidden tracking area identifier (TAI) list in accordance with one novel aspect. LTE/NR network 100 comprises application server 111 that provides various services by communicating with a plurality of user equipments (UEs) including UE 114. In the example of FIG. 1, application server 111 and a packet data network gateway (PDN GW or P-GW) 113 belong to part of a core network CN 110. UE 114 and its serving base station BS 115 belong to part of a radio access network RAN 120. RAN 120 provides radio access for UE 114 via a radio access technology (RAT). Application server 111 communicates with UE 114 through PDN GW 113, serving GW 116, and BS 115. A mobility management entity (MME) or an access and mobility management function (AMF) 117 communicates with BS 115, serving GW 116 and PDN GW 113 for access and mobility management of wireless access devices in LTE/NR network 100. UE 114 may be equipped with a radio frequency (RF) transceiver or multiple RF transceivers for different application services via different RATs/CNs. UE 114 may be a smart phone, a wearable device, an Internet of Things (IoT) device, and a tablet, etc.

EPS and 5GS networks are packet-switched (PS) Internet Protocol (IP) networks. This means that the networks deliver all data traffic in IP packets, and provide users with Always-On IP Connectivity. When UE joins an EPS/5GS network, a Packet Data Network (PDN) address (i.e., the one that can be used on the PDN) is assigned to the UE for its connection to the PDN. EPS calls the UE's "IP access connection" an evolved packet system (EPS) bearer, which is a connection between the UE and the P-GW. The P-GW is the default gateway for the UE's IP access. EPS has defined a Default EPS Bearer to provide the IP Connectivity that is Always-On. UE may establish additional data radio bearers for data communication. However, under some scenarios, UE can receive services from the network without establishing a dedicated PDN connection.

When a UE is switched on, it searches for a network to connect. Once the UE selects the desired network, it will try to attach to the network and attempts registration with the network. To facilitate the network selection process, the UE may have an operator-controlled PLMN selector list and a user-controlled PLMN selector list stored on the SIM/USIM card. The UE may utilize all the information stored in the SIM/USIM related to network selection, e.g., HPLMN, operator-controlled PLMN selector list, user-controlled PLMN selector list, and forbidden PLMN list. When a registration attempt by the UE is rejected by a network, the PLMN identity is written to a list of forbidden PLMNs stored in a data filed on the SIM/USIM. If a successful registration is achieved on a PLMN in the forbidden PLMN list, then the PLMN identity is removed from the list. The forbidden PLMN list is to avoid unnecessary registration attempts.

In addition to the PLMN, UE location is known by the network at track area (TA). A tracking area identifier (TAI) consists of a PLMN ID and a tracking area code (TAC). The mobility management in 5G NR systems has two types of TAI list—a service area list including a list of allowed or non-allowed TAI and a list of forbidden TAI. When a UE attaches to a network and receives an error in a registration procedure, a TAI is added into the forbidden TAI list. The forbidden TAI list is maintained in the UE, and is reset by the UE when the UE is switched off, or when a UICC containing the SIM/USIM is removed, or is periodically reset. In a subsequent registration procedure, the network may provide the UE with allowed tracking areas. Tracking area(s) can be removed from the forbidden TAI list if one or more tracking areas in the list are received from the network. However, if the UE is registered for emergency services, then the tracking area(s) may not be removed. Furthermore, the network may provide the UE with the allowed tracking areas via a configuration update command.

In accordance with one novel aspect, a method of maintaining a proper forbidden tracking area identifier (TAI) list is proposed. As depicted by 140 of FIG. 1, UE 114 maintains a forbidden TAI list. UE 114 receives a service area list or a tracking area list comprising one or more allowed tracking areas from MME/AMF 117. The service area list may be carried by a configuration update command or by a registration accept message in response to a registration request. UE 114 compares if any of the allowed tracking area having a matching TAI in the forbidden TAI list. Accordingly, UE 114 removes any allowed tracking areas having a matching TAI from the forbidden TAI list. In one specific embodiment, UE 114 sends a REGISTRATION REQUEST message to MME/AMF 117 to initiate a registration procedure. If the registration procedure is successful, UE 114 receives a REGISTRATION ACCEPT message, which may also carry a service area list with one or more allowed tracking areas. UE 114 may remove the allowed tracking area having a matching TAI from the forbidden TAI list. However, if UE 114 is registered for emergency services with/without PDU session, UE 114 shall not remove the allowed tracking area from the forbidden TAI list.

Figure 2:
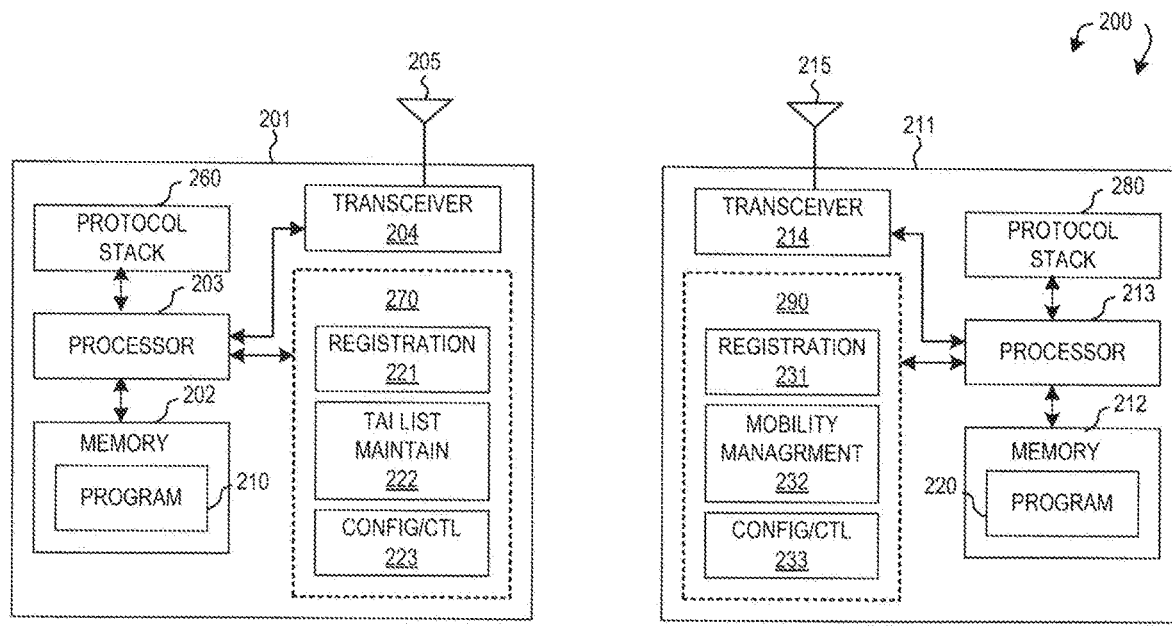
FIG. 2 illustrates simplified block diagrams of a user equipment (UE) in accordance with embodiments of the current invention.

FIG. 2 illustrates simplified block diagrams of wireless devices, e.g., a UE 201 and network entity 211 in accordance with embodiments of the current invention. Network entity 211 may be a base station combined with an MME or AMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes a set of control functional modules and circuit 290. Registration circuit 231 handles registration procedure. Mobility management circuit 232 handles mobility management functionalities. Configuration and control circuit 233 provides different parameters to configure and control UE.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise Non-Access-Stratum (NAS) layer to communicate with an MME or an AMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise registration circuit 221 that performs registration procedure with the network, a TAI list maintenance circuit 222 that handles the adding, removing, and resetting of a forbidden TAI list in memory, a config and control circuit 223 that handles configuration and control parameters.

Figure 3:
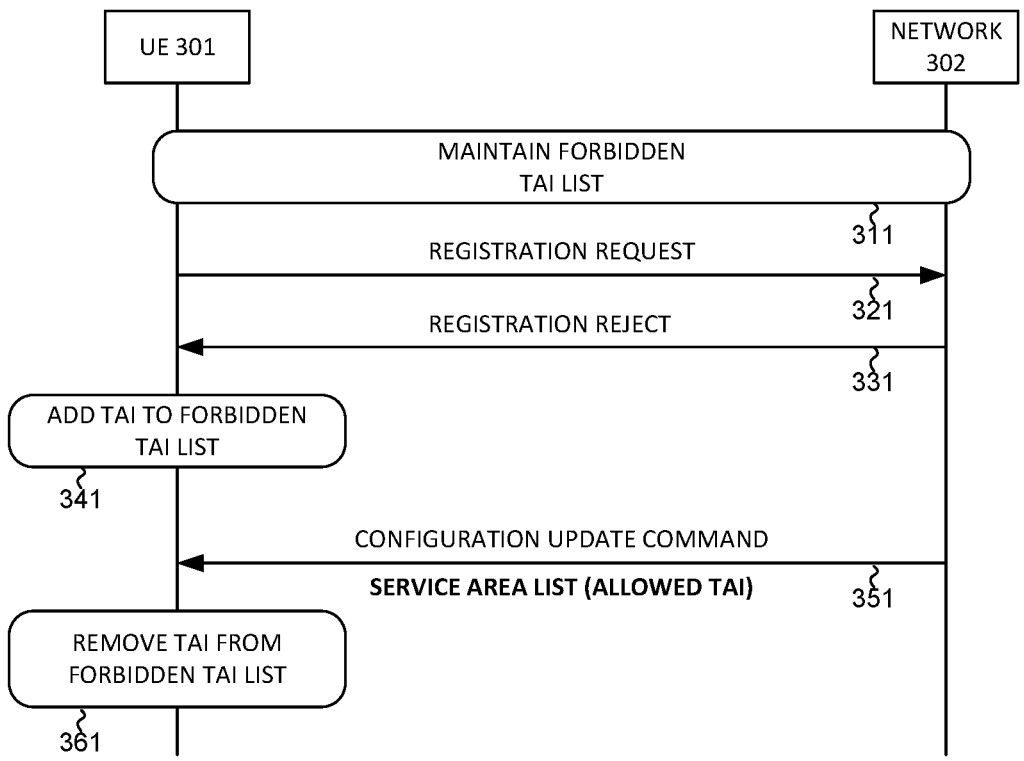
FIG. 3 illustrates a first embodiment of adding or removing TAI in a forbidden TAI list in accordance with one novel aspect.

FIG. 3 illustrates a first embodiment of adding or removing TAI in a forbidden TAI list in accordance with one novel aspect. UE 301 is located in a tracking area of network 302 having an access and mobility management function (AMF) entity. In step 311, UE 301 maintains a forbidden TAI list comprising a list of tracking area identifies. In 5G NR network, the forbidden TAI list is also referred to as a list of "5GS forbidden tracking areas for roaming", or a list of "5GS forbidden tracking areas for regional provision of service". If a TAI is contained in the forbidden TAI list, then the UE is forbidden to roam or receive service in the corresponding tracking area. In step 321, UE 301 transmits a registration request message to network 302 to request for service. In step 331, UE 301 receives a registration reject message from network 302, e.g., due to a network error. As a result, in step 341, UE 301 adds the TAI of the tracking area into the forbidden TAI list.

Later, in step 351, UE 301 receives a configuration update command from network 302. The network may send such update command when it recovers from the network error or the network changes its policy. The configuration update command provides UE 301 with a service area list with allowed tracking areas including one or more TAIs. Upon receiving such service area list, in step 361, UE 301 compares if the one or more TAI values received in the service area list of allowed tracking areas equals with TAI values stored in the forbidden TAI list. If one or more matchings of TAI values are found in the forbidden TAI list, then in step 361, UE 301 removes those equal TAI values from the forbidden TAI list.

Figure 4:
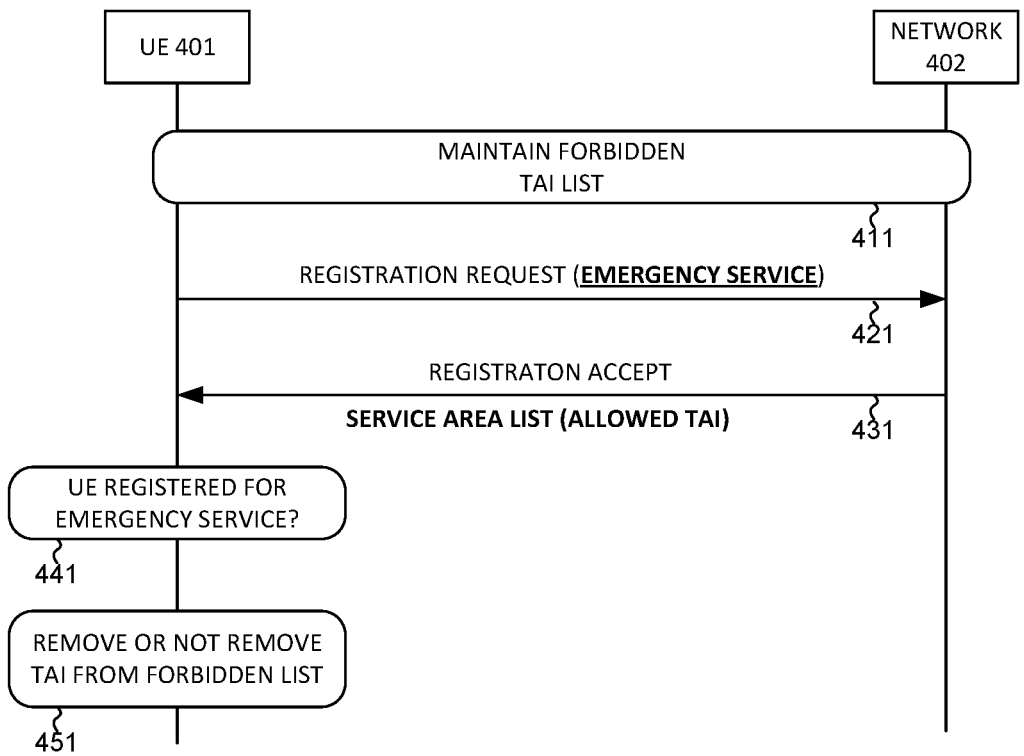
FIG. 4 illustrates a second embodiment of adding or removing TAI in a forbidden TAI list in accordance with one novel aspect.

FIG. 4 illustrates a second embodiment of adding or removing TAI in a forbidden TAI list in accordance with one novel aspect. UE 401 is located in a tracking area of network 402 having an access and mobility management function (AMF) entity. In step 411, UE 401 maintains a forbidden TAI list comprising a list of tracking area identifies. In 5G NR network, the forbidden TAI list is also referred to as a list of "5GS forbidden tracking areas for roaming", or a list of "5GS forbidden tracking areas for regional provision of service". If a TAI is contained in the forbidden TAI list, then the UE is forbidden to roam or receive service in the corresponding tracking area. In step 421, UE 401 transmits a registration request message to network 402 to request for service. In this embodiment, the registration type is set to "emergency registration" in the registration request message.

In step 431, UE 401 receives a registration accept message from the network, and UE 401 is successfully registered for emergency services in the tracking area. The registration accept message may also carry a service area list with allowed tracking areas including one or more TAIs. In step 441, UE 401 checks if the UE is registered for emergency service or not. If the answer is no, then UE 401 removes the matching TAI value from the forbidden TAI list. Otherwise, if the answer is yes, then UE 401 does not remove the matching TAI value from the forbidden TAI list. Note that UE performs registration for emergency under two scenarios: a first scenario is UE does not establish any PDU session, and a second scenario is UE establishes one or more PDU sessions for emergency services. Under both scenarios of emergency registration, UE shall not remove the matching TAI value from the forbidden TAI list.

Figure 5:
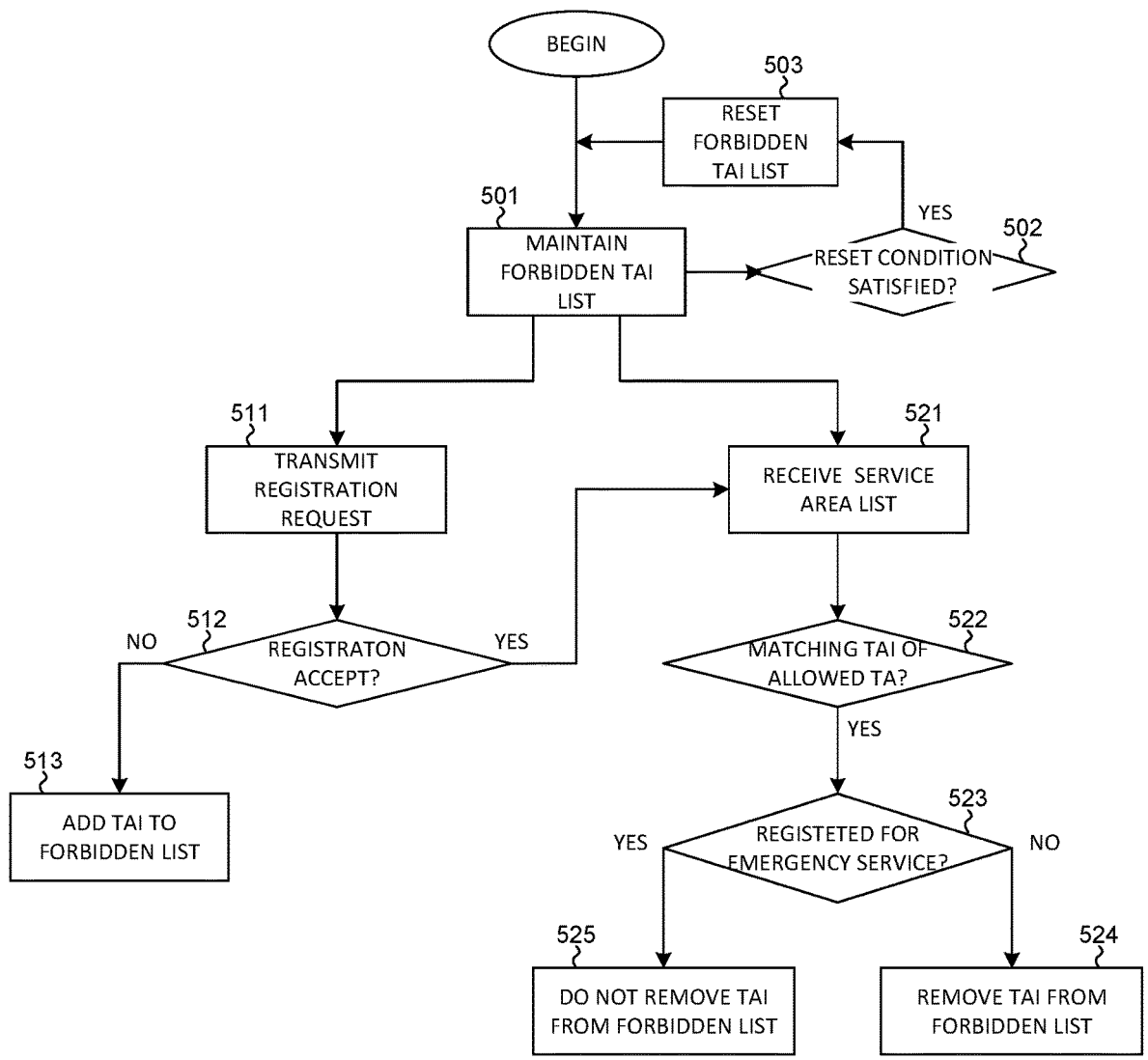
FIG. 5 illustrates a detailed flow chart of UE maintaining a forbidden TAI list in LTE/NR networks in accordance with one novel aspect.

FIG. 5 illustrates a detailed flow chart of UE maintaining a forbidden TAI list in EPS/5GS networks in accordance with one novel aspect. In step 501, UE maintains a forbidden TAI list. UE 501 can reset the forbidden TAI list when a reset condition is satisfied. In step 502, UE determines whether such reset condition is met. The reset condition comprises: 1) when the UE is switched off, 2) when a universal integrated circuit card (UICC) containing the SIM/USIM is removed, and 3) periodically (e.g., with a periodicity in the range from 12 to 24 hours). In step 503, UE resets the forbidden TAI list if any of the reset condition is met and UE goes back to step 501, otherwise UE directly goes back to step 501 without resetting.

In step 511, UE initiates a registration procedure by transmitting a registration request to the network. The registration request comprises a registration type for receiving normal service or emergency service in a tracking area. In step 512, UE receives a registration accept or reject message from the network. If the registration is rejected, then UE goes to step 513 and add the TAI of the tracking area to the forbidden TAI list. Note that in addition to the registration procedure, there are other possibilities to add a TAI into the forbidden TAI list. For example, under the 3GPP specification, UE shall update the forbidden TAI list whenever a registration reject message, a service reject message, or a deregistration request message is received with cause "tracking area not allowed", "roaming not allowed in this tracking area", or "no suitable cells in tracking area".

If the registration is accepted, then UE goes to step 521 and checks whether UE has received any service area list containing one or more allowed tracking areas. Note that the allowed tracking areas can be included in a registration accept message from the network in response to a UE registration request, or can be included in a configuration update command message from the network without any UE request. In other words, step 521 can happen directly after step 501, without any registration procedure. For example, when the network recovers from an error condition, it may send UE one or more allowed tracking areas via the configuration update command message. In step 522, UE checks whether the one or more allowed tracking areas having a matching TAI in the forbidden TAI list. If the answer is yes, then in step 523, UE further checks whether the UE is registered for emergency services, with or without any PDU sessions. If the answer is yes, then UE does not remove the matching TAI from the forbidden TAI list (step 525); if the answer is no, then UE removes the matching TAI from the forbidden TAI list (step 524).

Figure 6:
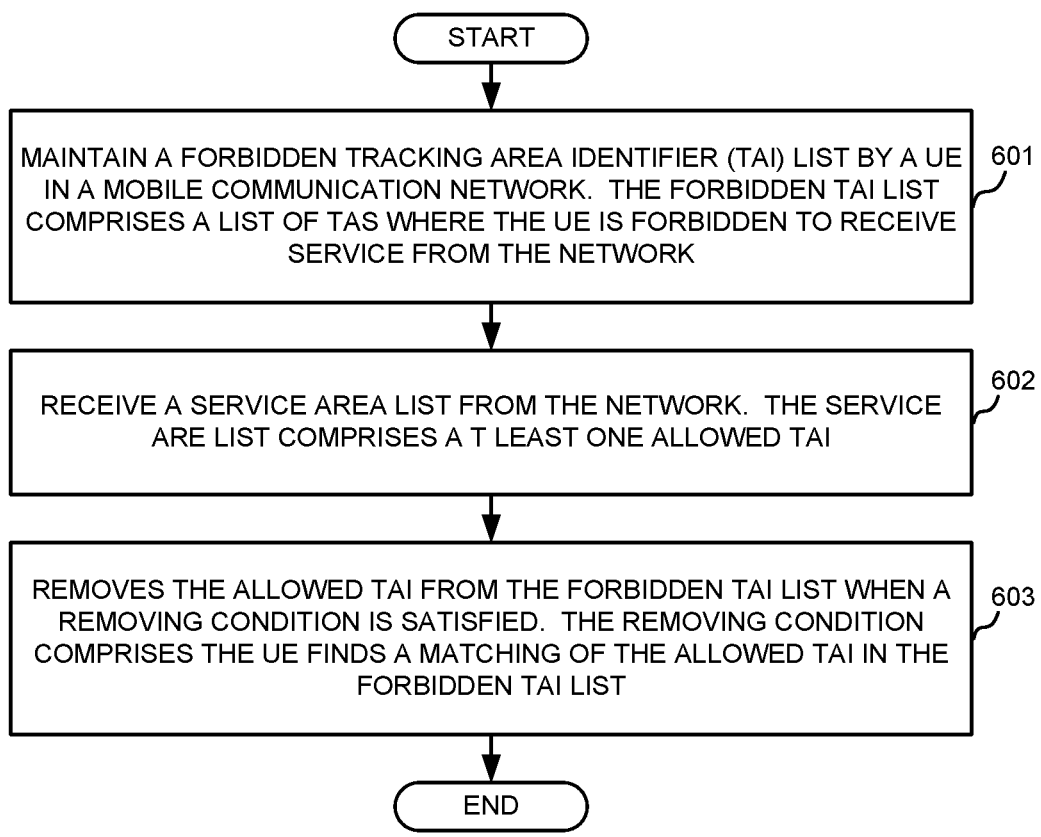
FIG. 6 is a flow chart of a method of UE maintaining a forbidden TAI list in accordance with one novel aspect.

FIG. 6 is a flow chart of a method of UE maintaining a forbidden TAI list in accordance with one novel aspect. In step 601, a UE maintains a forbidden tracking area identifier (TAI) list in a mobile communication network. The forbidden TAI list comprises a list of TAs where the UE is forbidden to receive services from the network. In step 602, the UE receives a service area list from the network. The service area list comprises at least one allowed TAI. In step 603, the UE removes the allowed TAI from the forbidden TAI list when a removing condition is satisfied. The removing condition comprises the UE finds a matching of the allowed TAI in the forbidden TAI list. In one embodiment, the service area list is carried by a configuration update command message transmitted from the network. In another embodiment, the service area list is carried by a registration accept message from the network in response to a registration request message. If the UE is registered for emergency services, however, then the UE does not remove the allowed TAI from the forbidden TAI list.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
    maintaining a forbidden tracking area identifier (TAI) list by a user equipment (UE) in a mobile communication network, wherein the forbidden TAI list comprises a list of TAs where the UE is forbidden to receive services from the network;
    receiving a service area list from the network, wherein the service area list comprises at least one allowed TAI; and
    removing the allowed TAI from the forbidden TAI list when a removing condition is satisfied, wherein the removing condition comprises the UE finds a matching of the allowed TAI in the forbidden TAI list, wherein the removing condition is not satisfied when the UE is registered for emergency services.

2. The method of claim 1, wherein the service area list is carried by a configuration update command message transmitted from the network.

3. The method of claim 1, wherein the UE resets the forbidden TAI list when a reset condition is satisfied.

4. The method of claim 3, wherein the reset condition comprises one of the UE is power cycled, a universal integrated circuit card (UICC) is removed, and a predefined periodicity has reached.

5. The method of claim 1, wherein the UE receives a registration reject message in response to a registration request, and wherein the UE adds a corresponding TAI to the forbidden TAI list.

6. A method comprising:
    maintaining a forbidden tracking area identifier (TAI) list by a user equipment (UE) in a mobile communication network, wherein the forbidden TAI list comprises a list of TAs where the UE is forbidden to receive services from the network;
    transmitting a registration request to the network;
    receiving a registration accept message from the network in response to the registration request, wherein the registration accept message carries a service area list that comprises at least one allowed TAI; and
    removing the allowed TAI from the forbidden TAI list when a removing condition is satisfied, wherein the removing condition comprises the UE finds a matching of the allowed TAI in the forbidden TAI list, wherein the registration request carries a registration type of emergency registration, and wherein the removing condition is not satisfied.

7. The method of claim 6, wherein the registration request carries a registration type of emergency registration or is for a subsequent registration procedure, and wherein the removing condition is not satisfied.

8. The method of claim 6, wherein the UE establishes a packet data unit (PDU) session for receiving emergency services.

9. The method of claim 6, wherein the UE does not establish any packet data unit (PDU) session for receiving emergency services.

10. A User Equipment (UE), comprising:
    memory that stores a forbidden tracking area identifier (TAI) list in a mobile communication network, wherein the forbidden TAI list comprises a list of TAs where the UE is forbidden to receive services from the network;
    a receiver that receives a service area list from the network, wherein the service area list comprises at least one allowed TAI; and
    a TAI list maintenance circuit that removes the allowed TAI from the forbidden TAI list when a removing condition is satisfied, wherein the removing condition comprises the UE finds a matching of the allowed TAI in the forbidden TAI list, wherein the removing condition is not satisfied when the UE is registered for emergency services.

11. The UE of claim 10, wherein the service area list is carried by a configuration update command message transmitted from the network.

12. The UE of claim 10, wherein the UE resets the forbidden TAI list when a reset condition is satisfied.

13. The UE of claim 12, wherein the reset condition comprises one of the UE is power cycled, a universal integrated circuit card (UICC) is removed, and a predefined periodicity has reached.

14. The UE of claim 10, wherein the UE receives a registration reject message in response to a registration request, and wherein the UE adds a corresponding TAI to the forbidden TAI list.

15. A User Equipment (UE), comprising:
    memory that stores a forbidden tracking area identifier (TAI) list in a mobile communication network, wherein the forbidden TAI list comprises a list of TAs where the UE is forbidden to receive services from the network;
    a transmitter that transmits a registration request to the network, wherein the UE receives a registration accept message from the network in response to the registration request, wherein the registration accept message carries a service area list that comprises at least one allowed TAI; and a TAI list maintenance circuit that removes the allowed TAI from the forbidden TAI list when a removing condition is satisfied, wherein the removing condition comprises the UE finds a matching of the allowed TAI in the forbidden TAI list, wherein the registration request carries a registration type of emergency registration, and wherein the removing condition is not satisfied.

16. The UE of claim 15, wherein the registration request carries a registration type of emergency registration or is for a subsequent registration procedure, and wherein the removing condition is not satisfied.

17. The UE of claim 15, wherein the UE establishes a packet data unit (PDU) session for receiving emergency services.

18. The UE of claim 15, wherein the UE does not establish any packet data unit (PDU) session for receiving emergency services.

* * * * *